(12) United States Patent
Krajcovic et al.

(10) Patent No.: US 11,250,970 B2
(45) Date of Patent: Feb. 15, 2022

(54) ELECTRIC POWER TRANSMISSION CABLE

(71) Applicant: NV Bekaert SA, Zwevegem (BE)

(72) Inventors: Martin Krajcovic, Trnava (SK); Wim Van Haver, Aalter (BE); Christophe Degraer, Merelbeke (BE)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 17/265,873

(22) PCT Filed: Sep. 2, 2019

(86) PCT No.: PCT/EP2019/073310
§ 371 (c)(1),
(2) Date: Feb. 4, 2021

(87) PCT Pub. No.: WO2020/057947
PCT Pub. Date: Mar. 26, 2020

(65) Prior Publication Data
US 2021/0202131 A1    Jul. 1, 2021

(30) Foreign Application Priority Data

Sep. 21, 2018   (EP) ..................................... 18195873

(51) Int. Cl.
*H01B 7/14* (2006.01)
*H01B 7/22* (2006.01)
(Continued)

(52) U.S. Cl.
CPC ............... *H01B 7/14* (2013.01); *H01B 7/226* (2013.01); *H01B 7/2806* (2013.01)

(58) Field of Classification Search
CPC ... H01B 7/14; H01B 7/17; H01B 7/18; H01B 7/22; H01B 7/226; H01B 7/228;
(Continued)

(56) References Cited

U.S. PATENT DOCUMENTS

| 2012/0024565 A1* | 2/2012 | Orini ........................ H01B 7/14 174/106 R |
| 2019/0057794 A1* | 2/2019 | Jung ..................... H01B 7/0208 |
| 2020/0135361 A1* | 4/2020 | Tyrberg ................. H01B 13/06 |

FOREIGN PATENT DOCUMENTS

| EP | 0 173 402 | 3/1986 |
| SE | 1850325 | 3/2018 |
| WO | 2017/080998 | 5/2017 |

OTHER PUBLICATIONS

International Search Report dated Nov. 19, 2019, in International (PCT) Application No. PCT/EP2019/073310.

* cited by examiner

*Primary Examiner* — Hoa C Nguyen
*Assistant Examiner* — Amol H Patel
(74) *Attorney, Agent, or Firm* — Wenderoth, Lind & Ponack, L.L.P.

(57) ABSTRACT

An electric power transmission cable comprises electric power conductors and a plurality of parallel spiralled armouring wires. The electric power transmission cable comprises along its length a first section (I), a second section (III) and a transition section (II). The transition section (II) is provided between the first section (I) and the second section (III). The plurality of parallel spiralled armouring wires in the first section (I) comprises or consists out of first armouring wires (121). The first armouring wires (121) are carbon steel wires comprising a metallic corrosion resistant coating. At least part of the plurality of parallel spiralling armouring wires in the second section (III) comprise austenitic steel wires (123). In the transition section (II), ends of first armouring wires (121) are individually welded to ends of austenitic steel wires (123) of the second section (III). The transition section (II) starts at the first weld (137) between a first armouring wire (121) and an austenitic steel wire (123).

(Continued)

The transition section (II) ends at the last weld (130) between a first armouring wire (121) and an austenitic steel wire (123). The transition section (II) is at least 10 meter long.

19 Claims, 1 Drawing Sheet

(51) Int. Cl.
  *H01B 7/28* (2006.01)
  *H02G 1/10* (2006.01)
  *H02G 15/08* (2006.01)
(58) Field of Classification Search
  CPC .......... H01B 7/28; H01B 7/2806; H02G 1/10; H02G 15/08
  See application file for complete search history.

ELECTRIC POWER TRANSMISSION CABLE

TECHNICAL FIELD

The invention relates to high voltage electric power transmission cables, and more particularly to alternating current (AC) high voltage electric power transmission cables. A specific use of the electric power transmission cable of the invention is in submarine cables coming onshore.

BACKGROUND ART

A typical submarine cable for AC power transmission comprises one or more conductors. The cable comprises a circumferential armour of spirally wound metal wires or tapes. The armour may be covered by a polymeric sheath, or by one or more layers of yarns. A thin polymeric sheath can also be applied on each individual armouring wire.

The armour has the function of improving the mechanical characteristics and performance of the cable, as well as to provide resistance against external damage. Typically, the armour is made of one or two layers of wires, round or flat in shape, made of steel with low to medium carbon content. Steel is generally used due to its low cost, availability and good mechanical properties. Galvanized steel is preferably used—especially but not only—when the armouring wires are exposed to the environment without any polymeric sheath or yarn layer, in order to ensure better resistance to corrosion.

In an AC power cable, the magnetic field generated by the current flowing in the conductor's induces losses in ferromagnetic materials, such as low to medium carbon steel used as armouring wires. With "ferromagnetic material" is meant a material having high magnetic permeability, i.e. a material capable of concentrating magnetic flux by a factor of more than 10. The magnetic domains of the ferromagnetic material rotate with the magnetic field in alternate current cables. This rotation of magnetic domains in the material causes friction and heat. The heat produced by this friction is called magnetic hysteresis loss. Such an induced heat, added to that produced by the conductors due to the current transport, can hinder the overall current carrying capacity of the cable, especially when the cable is deployed in an environment with low or null heat dissipation capability.

In use, submarine cables are generally installed under water, typically buried under the bottom ground, but portions thereof may be laid in different environment; this is, for example, the case of shore ends of submarine links, intermediate islands crossing, contiguous land portions, edge of canals and similar situations. Critical aspects of these environments are often worse thermal characteristics and/or higher temperature compared to the situation in the offshore main route.

US2012/0024565A1 discloses an electric power transmission cable including at least one first section provided with cable armour made of a first metallic material, and at least one second section provided with a cable armour made of a second metallic material. The second metallic material has ferromagnetic properties substantially lower than those of the first metallic material.

EP0173402A1 discloses armoured submarine power cables designed for laying in waters with varying depths. The cable has an armour which is heavy and strong (steel wires) in shallow water sections. In very deep waters the weight of steel armour is prohibitive so that in these sections the armour is made of synthetic light weight material. The transitions between the two types of armour are made physically concentrated but flexible enough to prevent sharp bends of the cable core as it passes cable laying machinery. The armour joint may be displaced from cable core joints and substantially effectively transfers all longitudinal strain in the cable.

DISCLOSURE OF INVENTION

The invention is an electric power transmission cable comprising electric power conductors and a plurality of parallel spiralled armouring wires. Preferably, the electric power conductors are continuous power conductors. The electric power transmission cable comprises along its length a first section, a second section and a transition section. The transition section is provided between the first section and the second section. The plurality of parallel spiralled armouring wires in the first section comprises or consists out of first armouring wires. The first armouring wires are carbon steel wires comprising a metallic corrosion resistant coating. At least part of the plurality of parallel spiralling armouring wires in the second section comprise austenitic steel wires. In the transition section, ends of first armouring wires are individually welded to ends of austenitic steel wires of the second section. The transition section starts at the first weld between a first armouring wire and an austenitic steel wire. The transition section ends at the last weld between a first armouring wire and an austenitic steel wire. The transition section is at least 10 meter long; and preferably at least 25 meter long, more preferably at least 40 meter long.

Due to the use of the different types of spiralled armouring wires, the heat generation in the first section and in the second section of the electric power transmission cable will be totally different. The first section comprises the first armouring wires, which are carbon steel wires comprising a metallic corrosion resistant coating, and thus are ferromagnetic. Considerable heat generation will occur due to the ferromagnetic armouring wires in the first section. The second section comprises austenitic steel wires, which are substantially non-magnetic. Virtually no or limited heat will be generated in these austenitic steel wires by magnetic fields generated by the current flowing in the conductors. It is a benefit that the provision of the transition section which is at least 10 meters long—and preferably at least 25 meter long, more preferably at least 40 meter long—provides along the length of the cable a gradual change in the heat generated in the spiralled armouring wires by the magnetic fields, and not a sudden change.

Preferably, the carbon steel has a ferritic or a ferritic/perlitic microstructure.

Preferably, the carbon steel is a low alloyed steel; with low alloyed steel is meant a steel alloy having less than 5% by weight of alloy elements.

Preferably, the carbon steel is a low carbon steel.

Preferably, the continuous electric power conductors comprise stranded copper wires.

Preferably, the continuous electric power conductors—e.g. stranded copper wires—comprise an insulating layer in order to insulate the continuous electric power conductors from each other. The insulating layer can e.g. be made out of cross-linked polyethylene (XLPE).

Preferably, the electric power transmission cable comprises a bedding—e.g. out of polyvinyl chloride (PVC)—between the continuous electric power conductors and the parallel spiralled armouring wires. The bedding provides a protective boundary between the inner layers and the outer layers of the cable.

Preferably, the electric power transmission cable comprises an external sheath surrounding the parallel spiralled armouring wires. The sheath—which e.g. can be made out of black PVC—holds the cable together and provides additional protection against external stresses.

Preferably, the welds in the transition section between the first armouring wires and the austenitic steel wires are evenly distributed along the length of the transition section.

Preferably, the first armouring wires and the austenitic steel wires have a round cross section or have a flat cross section or have a z-shaped cross section.

In an embodiment of the invention, the diameter of the first armouring wires differs from the diameter of the austenitic steel wires. In a more preferred embodiment, the diameter of the austenitic steel wires is higher than the diameter of the carbon steel wires. More preferably, the amount of the power conductors (expressed as surface area of power conductor in the cable cross section) is higher in the second section than in the first section. Such situations can be required when the first section is provided in a warmer environment resulting in lower specific conductivity of copper conductors. Therefore, it can be useful to provide more conduction in the first section; and because of the higher cross sectional area of the total conductors in the first section, also higher diameter armouring wires.

Preferably, the metallic corrosion resistant coating of the first armouring wires is provided by a hot dip zinc coating, by a hot dip zinc alloy coating, by an aluminium coating or by an aluminium alloy coating. An aluminium coating or an aluminium alloy coating can e.g. be applied by a cladding or extrusion process on the first armouring wires.

Preferably, the metallic corrosion resistant coating has been removed at the ends of the first armouring wires before the welding operation. More preferably a protective coating has been applied on the wire ends after welding. More preferably, the protective coating comprises zinc particles in a binder. The protective coating can e.g. be a zinc based enamel coating.

Preferably, part of the first armouring wires continue from the first section, through the transition section into the second section. More preferably, the first armouring wires provide between 30% and 70% of the total number of armouring wires in the second section.

In embodiments wherein part of the first armouring wires continue from the first section through the transition section into the second section, preferably, the first armouring wires—which are carbon steel wires comprising a metallic corrosion resistant coating—and the austenitic steel wires are provided in the second section according to a regular pattern around the circumference of the electric power transition cable.

Preferably, all parallel spiralling armouring wires in the second section are austenitic steel wires.

Preferably, the austenitic steel wires of the second section are provided with a metallic corrosion resistant coating. More preferably, the metallic corrosion resistant coating of the austenitic steel wires is provided by a hot dip zinc coating, by a hot dip zinc alloy coating, by an aluminium coating or by an aluminium alloy coating. An aluminium coating or an aluminium alloy coating can e.g. be applied by a cladding or extrusion process on the austenitic steel wires.

When the austenitic steel wires of the second section are provided with a metallic corrosion coating, preferably, at both wire ends in the weld the metallic corrosion coating is removed over a certain length before the welding operation. More preferably, a protective coating has been applied on the welded wire ends after welding, to cover the locations where the metallic corrosion coating has been removed. More preferably, the protective coating comprises zinc particles in a binder. Examples of protective coatings that can be applied include zinc based enamels.

Preferably, the welds are butt welds or overlap welds. When overlap welds are used, preferably a filler material is used in welding; more preferably, the filler material is an austenitic stainless steel grade comprising more alloy elements by weight than the austenitic steel of the austenitic steel wires.

Preferably, the austenitic steel is an austenitic stainless steel; or the austenitic steel is a hadfield steel; or the austenitic steel is a TWIP steel. A hadfield steel is a steel alloy containing between 0.8-1.25% by weight of carbon and between 11-15% by weight of manganese. A TWIP steel (or Twinning-Induced Plasticity steel) is a steel alloy comprising more than 20% by weight Mn, less than 1% by weight of carbon, less than 3% by weight of Si and preferably less than 3% by weight of aluminium.

A preferred electric power transmission cable is a three-phase power transmission cable.

MODE(S) FOR CARRYING OUT THE INVENTION

Figure 1:
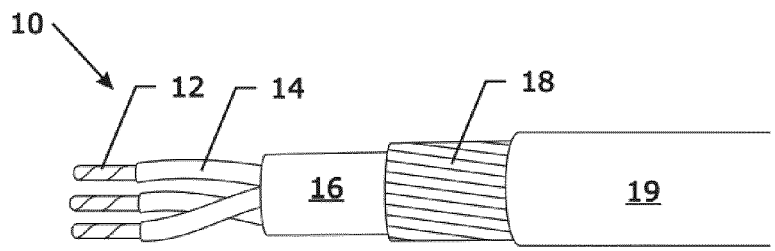
FIG. 1 shows an example of an electric power transmission cable according to the invention.

FIG. 1 shows an example of a three-phase electric power transmission cable 10. Continuous electric power conductors 12 can be made of stranded copper wires. Insulation 14 in the cable ensures that the conductors do not come into contact with each other or with other metal parts. Insulation 14 on the conductors—such as made of cross-linked polyethylene (XLPE)—has good water resistance and excellent insulating properties. Bedding 16, such as made of polyvinyl chloride (PVC), is used to provide a protective boundary between the inner and the outer layers of the cable. A plurality of parallel spiralled armouring wires 18, made of steel wires, provides mechanical protection, especially protection against external impact. In addition, the armouring wires 18 can relieve the tension during installation, and thus prevent copper conductors from elongating. A sheath 19, such as made of black PVC, can be provided to hold all components of the cable together and to provide additional protection against external stresses.

Figure 2:
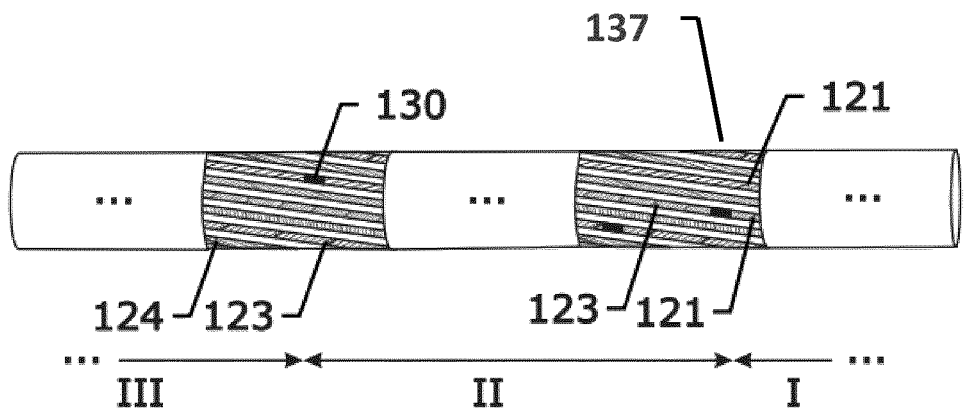
FIG. 2 shows a detail of the electric power transmission cable of FIG. 1.

FIG. 2 shows a detail of the exemplary inventive electric power transmission cable of FIG. 1, in which the sheath is removed. The electric power transmission cable comprises along its length a first section I, a second section III and a transition section II. The transition section is provided between the first section and the second section. The plurality of parallel spiralled armouring wires 121 in the first section consists out of first armouring wires, being carbon steel wires comprising a hot dip zinc coating in order to provide the carbon steel wires with corrosion resistance.

In the second section, the parallel spiralled armouring wires are provided alternatingly by an austenitic stainless steel wire 123 (e.g. out of AISI 202 austenitic stainless steel and having 6 mm diameter) and a carbon steel wire 124 (e.g. out of carbon steel according to EN10257-2 and having 6 mm diameter). The carbon steel wires are the first armouring wires which continue from the first section, through the transition section into the second section. This way, 50% of the armouring wires in the second section is provided by austenitic stainless steel wires and the other 50% is provided by carbon steel wires. The austenitic stainless steel wires of the second section are provided with a hot dip zinc coating to provide the austenitic stainless steel wires with corrosion resistance. In the transition section ends of first armouring wires 121 are individually butt-welded (butt welds 130) to ends of austenitic stainless steel wires 123 of the second section. The transition section II starts at the first butt weld (137) between a first armouring wire and an austenitic stainless steel wire; and ends at the last butt weld (130) between a first armouring wire and an austenitic stainless steel wire. In the example, the butt welds between carbon steel wires and austenitic steel wires are evenly distributed along the length of the transition section. The transition zone II is e.g. 14 meter long.

Figure 3:
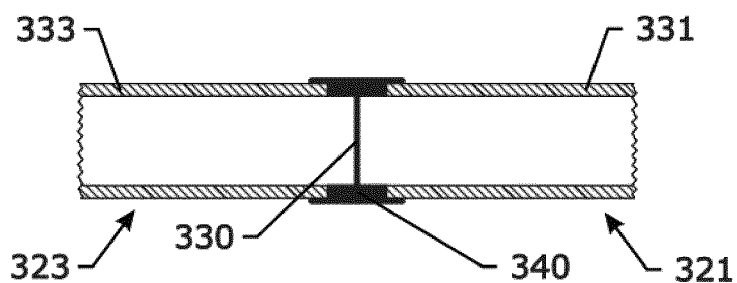
FIG. 3 shows a detail of a butt weld between a first armouring wire and an austenitic steel wire as can be used in the invention.

FIG. 3 shows a detail of a butt weld between a first armouring wire and an austenitic steel wire in the cable of FIG. 2. The end of a carbon steel wire 321 is butt welded in the transition section to the end of an austenitic steel wire 323. At both wire ends in the butt weld 330 the hot dip zinc coating 331, 333 is removed over a certain length before the welding operation. A protective coating 340 has been applied on the wire ends after butt welding at the locations where the metallic corrosion coating has been removed. The protective coating can e.g. be an enamel comprising zinc particles.

Figure 4:
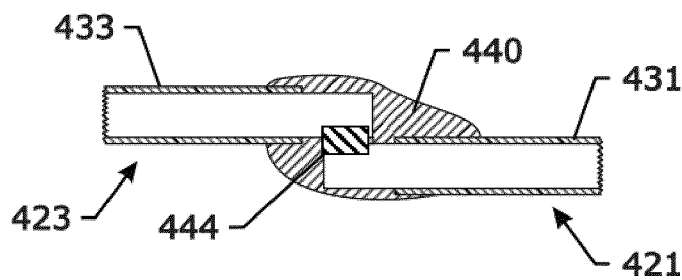
FIG. 4 shows a detail of an overlapping weld between a first armouring wire and an austenitic steel wire as can be used in the invention.

FIG. 4 shows an overlapping weld that can be used in the invention as an alternative for butt welding. The end of a carbon steel wire 421 is overlap welded in the transition section to the end of an austenitic steel wire 423, using a filler material 444. Before making the weld, the metallic corrosion coating—e.g. a hot dip zinc coating—331, 333 is removed over a certain length from both wire ends. A protective coating 440 has been applied after the welding operation at the locations where the metallic corrosion coating has been removed from both wire ends. The protective coating can e.g. be an enamel comprising zinc particles.

The invention claimed is:

1. An electric power transmission cable comprising electric power conductors; and
a plurality of parallel spiralled armouring wires;
wherein the electric power transmission cable comprises along its length a first section (I), a second section (III) and a transition section (II);
wherein the transition section (II) is provided between the first section (I) and the second section (III);
wherein the plurality of parallel spiralled armouring wires in the first section (I) comprises first armouring wires (121), wherein the first armouring wires (121) are carbon steel wires comprising a metallic corrosion resistant coating;
wherein at least part of the plurality of parallel spiralling armouring wires in the second section (III) comprise austenitic steel wires (123);
wherein in the transition section (II) ends of first armouring wires (121) are individually welded to ends of austenitic steel wires (123) of the second section (III);
wherein the transition section (II) starts at the first weld (137) between a first armouring wire (121) and an austenitic steel wire (123);
wherein the transition section (II) ends at the last weld between a first armouring wire (121) and an austenitic steel wire (123);
wherein the transition section (II) is at least 10 meter long.

2. The electric power transmission cable as in claim 1, wherein the welds in the transition section (II) between the first armouring wires (121) and the austenitic steel wires (123) are evenly distributed along the length of the transition section (II).

3. The electric power transmission cable as in claim 1, the preceding claims, wherein the first armouring wires (121) and the austenitic steel wires (123) have a round cross section or have a flat cross section or have a z-shaped cross section.

4. The electric power transmission cable as in claim 1, wherein the metallic corrosion resistant coating of the first armouring wires (121) is provided by a hot dip zinc coating or by a hot dip zinc alloy coating or by an aluminium coating or by an aluminium alloy coating.

5. The electric power transmission cable as in claim 4, wherein the austenitic steel wires (123) of the second section (III) are provided with a metallic corrosion resistant coating, wherein the metallic corrosion resistant coating of the austenitic steel wires (123) is provided by a hot dip zinc coating or by a hot dip zinc alloy coating or by an aluminium coating or by an aluminium alloy coating, wherein at both wire ends in the weld the metallic corrosion coating is removed over a certain length before the welding operation, and wherein after welding a protective coating (340) has been applied on the wire ends where the metallic corrosion coating has been removed.

6. The electric power transmission cable as in claim 5, wherein the protective coating (340) comprises zinc particles in a binder.

7. The electric power transmission cable as in claim 1, wherein the metallic corrosion resistant coating has been removed at the ends of the first armouring wires (121) before the welding operation.

8. The electric power transmission cable as in claim 7, wherein the austenitic steel wires (123) of the second section (III) are provided with a metallic corrosion resistant coating, wherein the metallic corrosion resistant coating of the austenitic steel wires (123) is provided by a hot dip zinc coating or by a hot dip zinc alloy coating or by an aluminium coating or by an aluminium alloy coating, wherein at both wire ends in the weld the metallic corrosion coating is removed over a certain length before the welding operation, and wherein after welding a protective coating (340) has been applied on the wire ends where the metallic corrosion coating has been removed.

9. The electric power transmission cable as in claim 8, wherein the protective coating (340) comprises zinc particles in a binder.

10. The electric power transmission cable as in claim 1, wherein part of the first armouring wires continue from the first section, through the transition section into the second section.

11. The electric power transmission cable as in claim 10, wherein the first armouring wires provide between 30% and 70% of the total number of armouring wires in the second section.

12. The electric power transmission cable as in claim 1, wherein all parallel spiralling armouring wires in the second section are austenitic steel wires.

13. The electric power transmission cable as in claim 1, wherein the austenitic steel wires (123) of the second section (III) are provided with a metallic corrosion resistant coating.

14. The electric power transmission cable as in claim 13, wherein the metallic corrosion resistant coating of the austenitic steel wires (123) is provided by a hot dip zinc coating or by a hot dip zinc alloy coating or by an aluminium coating or by an aluminium alloy coating.

15. The electric power transmission cable as in claim 1, wherein the welds are butt welds or overlap welds.

16. The electric power transmission cable as in claim 1, wherein the austenitic steel is an austenitic stainless steel or wherein the austenitic steel is a hadfield steel or wherein the austenitic steel is a TWIP steel.

17. The electric power transmission cable as in claim 1, wherein the cable is a three-phase power transmission cable.

18. The electric power transmission cable as in claim 1, wherein the plurality of parallel spiralled armouring wires in the first section (I) consists of first armouring wires (121), wherein the first armouring wires (121) are carbon steel wires comprising a metallic corrosion resistant coating.

19. The electric power transmission cable as in claim 1, wherein the metallic corrosion resistant coating has been removed at the ends of the first armouring wires (121) before the welding operation, wherein a protective coating has been applied on the wire ends after welding.

\* \* \* \* \*